Jan. 15, 1929.
F. MOSSBERG
PAN
Filed Feb. 23, 1926
1,699,372
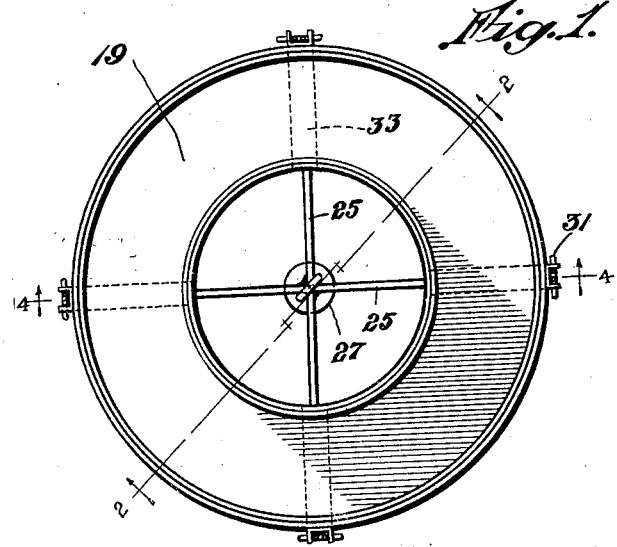
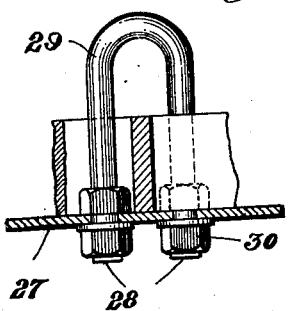
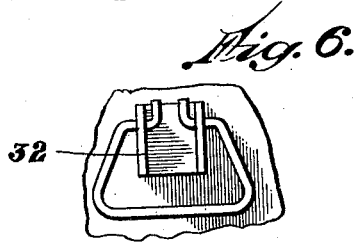
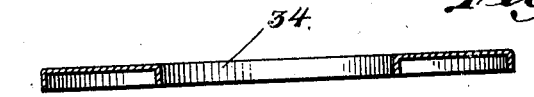
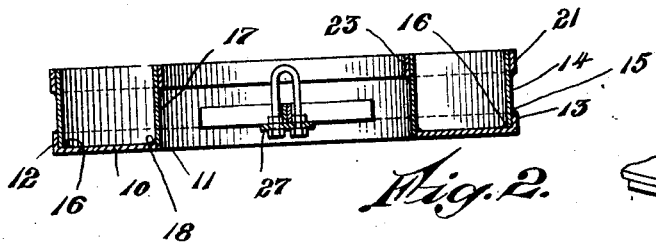
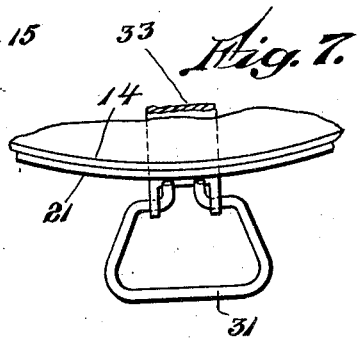
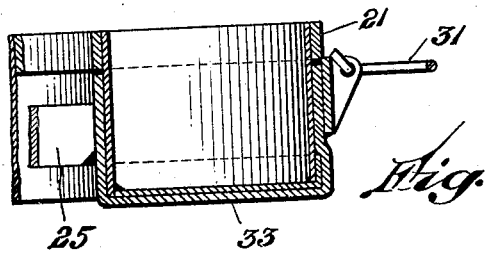
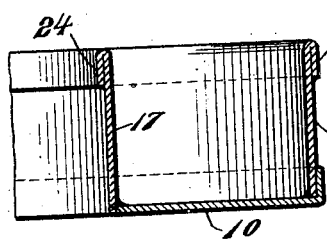
INVENTOR.
Frank Mossberg.
BY Barlow & Barlow
ATTORNEYS.

Patented Jan. 15, 1929.

1,699,372

UNITED STATES PATENT OFFICE.

FRANK MOSSBERG, OF ATTLEBORO, MASSACHUSETTS, ASSIGNOR TO MOSSBERG PRESSED STEEL CORPORATION, OF ATTLEBORO, MASSACHUSETTS, A CORPORATION OF MASSACHUSETTS.

PAN.

Application filed February 23, 1926. Serial No. 89,901.

This invention relates to an improved construction of sheet metal pan employed more particularly in the art of vulcanizing coils of insulated wire cable and the like, but which may be employed for any other purpose for which it is adapted; and the object of this invention is the provision of a pan of this character which is channel shape in radial cross section and has a bottom plate with inner and outer channeled annular walls welded to the bottom plate to form the desired channel construction.

With these and other objects in view, the invention consists of certain novel features of construction, as will be more fully described, and particularly pointed out in the appended claims.

In the accompanying drawings:

Figure 1 is a top view or plan of the channel-shaped pan with its cover removed.

Figure 2 is a section of my improved pan on line 2—2 of Figure 1.

Figure 3 is a sectional elevation of the lid or cover for the pan.

Figure 4 is an enlarged sectional view of the channel portion of the pan showing the reinforcing band or strip for supporting the channel portion when a lifting force is applied to the pan.

Figure 5 is a view enlarged from that shown in Figure 2, illustrating the attaching yoke through which lifting power may be applied to the pan.

Figure 6 is a side elevation of a portion of the side wall of the pan showing my improved form of handle connected thereto.

Figure 7 is a top view showing a portion of the outer channeled wall of the pan and showing the handle as swung up into operative position.

Figure 8 is a modified construction illustrating the inner and outer walls of the channel as having their edges or rim portions folded over to form reinforcing strips about their edges.

It is found in the practical construction and operation of heavily constructed pans of this character, which are formed of sheet metal so as to produce a pan which is relatively light to handle and yet of sufficient strength and durability to withstand the great strains of carrying heavy coils of insulated wire to be subjected to a vulcanizing heat, of advantage to so construct this pan that it may be readily engaged and possess the desired strain-resisting qualities. To accomplish which, I have formed the body or main portion of the pan of two annular spaced bands, each being welded to a supporting base plate. I have also formed a stiffening rim about the edge of the pan and means being provided at the center of the pan to which a lifting tackle may be applied. A separate lid is formed to cover the carrying space in the pan, the lid being so constructed that when applied it will not interfere with the connecting of the lifting power to the body portion; and the following is a detailed description of the present embodiment of my invention and showing one construction of pan by which these advantageous results may be accomplised:—

With reference to the drawings, 10 designates the base plate of the pan, which is provided with a central opening as at 11, and an upturned outer edge flange 12 within which flange is set the lower edge 13 of the annular band 14 to form the outer side wall for the channel, the lower edge of this wall being secured to this upturned flange 12 by an electro welding operation at the outer edge 15 and also in many cases at the inner corner 16.

An annular band forming the inner channel wall 17 is welded at 18 at its lower edge to the inner edge of the bottom plate 10 thus forming a pan which is channel shaped in radial cross section to provide an annular storing space 19 therein for electrical wire coils or the like.

In some instances, I provide a reinforcing strip or band 21 about the outer rim of the outer wall 14. This band may be formed either separately and welded into position, or it may be formed by folding the edge of this wall over outwardly as at 22, best shown in Figure 8. Also the inner wall 17 may be provided with an inner reinforcing edge or rim strip 23 which may, in some cases, be formed separately and welded into position as illustrated in Figure 2, while in other cases it may be formed by folding the upper edge of this wall inwardly, as illustrated at 24, in Figure 8.

In order to provide simple and effective means for applying lifting power to the pan and the load carried thereby, I have formed cross bars 25 and 26, the outer ends of which may be supported by the inner wall 17 of the pan, if desired, and at the center is shown a washer 27 beneath these bars at their point of crossing and through this washer I have passed the ends 28 of the yoke 29 which is secured thereto by nuts 30, the yoke being in such form as to straddle these bars leaving an open loop above them to which may be attached a hook or any rigging through which lifting power may be applied to the pan.

In some instances, I also apply a set of handles 31 by welding their plates 32 to the periphery of the outer wall 14.

In many instances where these pans are designed to carry an excessive load, I have found it of advantage to reinforce the walls of the same at the points where the strain is applied; and to accomplish this, I have provided a set of reinforcing strips 33, see Figure 4, at the point where the handles 31 and the ends of the bars 25 are secured, these bands being of a length to extend from the edge strip 21 around beneath the bottom plate and up along the inner wall and are preferably secured in position by a welding operation.

In some instances, it is found of advantage to provide a lid or cover 34 for the pan, which will fit over the channel portion of the same leaving the inner or central portion open and free to receive the power-lifting apparatus.

My improved sheet-metal vulcanizing pan is extremely strong and durable and yet comparatively inexpensive in construction.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A sheet metal pan channel-shape in radial cross section having a bottom plate with a central opening, an annular outer channel wall having a reinforcing rim with its lower edge welded to the outer edge of said bottom plate, an inner annular channel wall welded at its lower edge to the inner edge of said bottom plate and a cross bar fixed in said central opening.

2. A sheet metal pan channel-shape in radial cross section having a bottom plate with a central opening, an annular outer channel wall having an integral outwardly folded reinforcing rim and having its lower edge welded to the outer edge of said bottom plate, and an inner channel wall welded at its lower edge to the inner edge of said bottom plate and reinforced at its upper edge a cross bar fixed in said central opening, and attaching means connected to said cross bar to which lifting power may be applied to the pan.

3. A sheet metal pan channel shape in radial cross section having a bottom plate with a central opening and an upturned flange on its outer edge, an annular outer channel wall having a reinforcing rim and having its lower edge set inside and welded to said upturned flange, an inner channel wall welded at its lower edge to the edge of said bottom plate and reinforced at its upper edge, and a cross bar fixed in said central opening.

4. A sheet metal pan channel-shape in radial cross section having a bottom plate with a central opening and an upturned flange on its outer edge, an annular outer channel wall having a reinforcing rim and having its lower edge set inside and welded to said upturned flange, an inner channel wall welded at its lower edge to said bottom plate and reinforced at its upper edge, a cross bar fixed in said central opening, and attaching means connected to said cross bar to which lifting power may be applied to the pan.

5. A sheet metal pan channel-shape in radial cross section having a bottom plate with a central opening, an annular outer channel wall having its lower edge welded to said bottom plate, lifting handles on the periphery of the pan, and a radially disposed reinforcing strip about the channel for supporting the pan when lifted by the handles.

6. A sheet metal pan channel-shape in cross section having a bottom plate with a central opening, an annular outer channel wall having a reinforcing rim and having its lower edge welded to said bottom plate, an inner channel wall welded at its lower edge to said bottom plate, a cross bar fixed in said central opening, attaching means connected to said cross bar through which lifting power may be applied to the pan, and reinforcing strips to which said cross bar is connected, arranged to support the pan when power is applied to the bar.

7. A sheet metal pan channel-shape in radial cross section having a bottom plate with a central opening and an upturned flange on its outer edge, an annular outer channel wall having a reinforcing rim and having its lower edge set inside and welded to said upturned flange, an inner channel wall welded at its lower edge to the inner edge of said bottom plate and reinforced at its upper edge, a cross bar fixed in said central opening, attaching means connected to said cross bar through which lifting power may be applied to the pan, lifting handles on the periphery of the pan, and reinforcing strips embracing the channel portion to which said cross bar and said handles are attached for supporting the pan when lifting power is applied either to said handles or said cross bar.

8. A sheet metal pan having a bottom plate, an annular outer wall having its lower edge welded to said bottom plate, an annular inner wall spaced from the outer wall and having its lower edge welded to said bottom plate, lifting handles on the periphery of the pan, and a radially disposed reinforcing strip positioned for supporting the pan when lifted by the handles.

9. A sheet metal pan having a bottom plate, an annular outer wall having its lower edge welded to said bottom plate, an annular inner wall spaced from the outer wall and having its lower edge welded to said bottom plate, and means located within the inner wall to which lifting power may be applied to the pan.

In testimony whereof I affix my signature.

FRANK MOSSBERG.